United States Patent Office 3,144,466
Patented Aug. 11, 1964

3,144,466
DIACYL ESTERS OF DE-OLEANDROSEHYDROXY-
OLEANDOMYCIN AND PROCESS THEREFOR
Walter D. Celmer, New London, Conn., assignor to Chas.
Pfizer & Co., Inc., New York, N.Y., a corporation of
Delaware
No Drawing. Filed Mar. 8, 1963, Ser. No. 263,743
10 Claims. (Cl. 260—343)

This invention relates to new and useful compounds derived from macrolide antibiotics and to the process employed for preparing them. More particularly, it is concerned with certain novel esters derived from oleandomycin-type antibiotics which are useful as intermediates in organic synthesis.

The compounds which come within the purview of the present invention are all 1,3-diacyloleandomycins wherein the oleandrose moiety has been replaced by a hydroxyl group. These compounds all possess the following general structural formula:

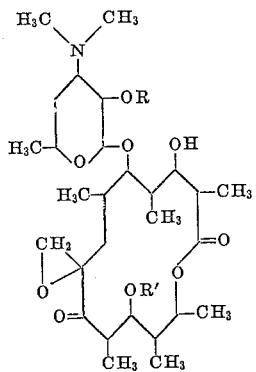

wherein each of R and R' is an acyl moiety derived from a hydrocarbon monocarboxylic acid having from two to six carbon atoms. Typical member compounds of this series include such "de-oleandrose-3-hydroxyoleandomycins" as de-oleandrose 1,3-diacetyloleandomycin, de-oleandrose 1,3-dipropionyloleandomycin, de-oleandrose 1,3-dibutyryloleandomycin, de-oleandrose 1,3-divaleryloleandomycin and de-oleandrose 1,3-dicaproyloleandomycin, as well as their mineral and organic acid addition salts.

The new compounds of this invention are particularly useful as intermediates in the production of still other medicinal antibiotic products. For instance, the first compound mentioned above, viz., de-oleandrose 1,3-diacetyloleandomycin, has been used to prepare 1,3-diacetyloleandomycin by a simple one-step condensation reaction involving the use of readily available starting materials. 1,3-diacetyloleandomycin itself is a known compound, first reported by the present inventor in U.S. Patent No. 3,022,219 as having unexpectedly advantageous medicinal properties along with triacetyloleandomycin. However, the method of preparation given in said patent has certain drawbacks and limitations unlike the present one, which will become even more obvious to those skilled in the art from the description which follows.

In accordance with the process employed for preparing the novel intermediate compounds of this invention, an appropriate triacyloleandomycin starting material like 1,2,3-triacetyloleandomycin, for example, is reacted with the proper hydrocarbon sulfonic acid to form a sulfonylhydrin sulfonate salt of the corresponding de-oleandrose oleandomycin diester, which is then converted back to the oleandomycin-type compound except that it now lacks the aforementioned oleandrose moiety. Considering the formation of the sulfonylhydrin sulfonates first, cleavage of the triacyloleandomycin starting material is ordinarily carried out in a reaction-inert polar organic solvent medium using at least twice the amount in moles of sulfonic acid reagent with respect to the starting material. The sulfonic acids used for this purpose are lower alkane hydrocarbon sulfonic acids like methanesulfonic acid, ethanesulfonic acid or n-propanesulfonic acid, etc., or they are aromatic hydrocarbon sulfonic acids such as benzene or p-toluenehydrocarbon sulfinic acid or the naphthalenesulfonic acids. Reaction-inert polar organic solvents in this connection include lower alkanols such as methanol, ethanol and isopropanol, ethylene glycol; lower alkyl ketones like acetone and methyl isobutyl ketone; N,N-di(lower alkyl) derivatives of lower alkane hydrocarbon carboxamides such as N,N-dimethylformamide, N,N-diethylformamide and N,N-dimethylacetamide; lower alkyl nitriles such as acetonitrile, propionitrile, etc.; and lower alkyl esters of lower alkane hydrocarbon carboxylic acids (i.e., alkanoic acids) like isopropyl formate, ethyl acetate and methylpropionate, for example. In general, the reaction can be conducted at any temperature in the range of from about 20° C. up to about 100° C. for a period of about one-half to about five hours. Recovery of the desired de-oleandrose diacyloleandomycin sulfonhydrin sulfonate from the reaction mixture is then easily accomplished by conventional means. For instance, the de-oleandrose oleandomycin-type salt may crystallize out of solution of its own accord or it may be necessary to evaporate some of the solvent first until crystallization commences and/or to chill said solution quite rapidly to a point slightly below room temperature until said step is completely effected.

Conversion of the sulfonylhydrin sulfonate salt so obtained to the corresponding de-oleandrose diacyloleandomycin base is then carried out by first filtering the aforesaid crystalline slurry of the salt and dissolving the resulting filter cake in an aqueous alkanolic solution of a base such as an alkali metal hydroxide like sodium hydroxide. This is done by simply dissolving the sulfonylhydrin sulfonate in the lower alkanol and then adding a sufficient amount of dilute aqueous alkali to adjust the pH of the final solution to a value that is at least about 8.0 and preferably one that is about 9.0, e.g., a preferred pH range would be pH 9.0–11.5. The pure organic base is then isolated from solution by means of solvent extraction with an organic solvent such as a halogenated hydrocarbon like methylene chloride, chloroform, ethylene dichloride, trichlorethylene, s-tetrachlorethane, and so forth. The latter solution can then be concentrated under reduced pressure so as to afford recovery of the desired key intermediate (the de-oleandrose diacyloleandomycin compound) in the form of a free base. The final isolation step, of course, involves filtering the crystalline material from the concentrate and drying said filtered crystals to constant weight.

Like the oleandomycin antibiotic bases from which they are derived, the compounds of this invention are all capable of forming a wide variety of stable salts with mineral acids such as hydrochloric, hydrobromic, sulfuric and phosphoric, as well as with the stronger organic acids such as oxalic, maleic, fumaric, tartaric, citric, benzoic, phthalic, salicylic, dichloroacetic, benzenesulfonic, p-toluenesulfonic, α- or β-naphthalenesulfonic, methanesulfonic, ethanesulfonic, and the like, provided that equivalent amounts (in moles) of acid and base are employed in each case. With weaker organic acids like acetic, propionic, lauric, stearic, oleic, lactic, etc., the salts formed all tend to hydrolyze on dissolution in water. These acid addition salts in general can easily be obtained directly from an organic solution of the free base in a solvent such as ethyl acetate or isopropanol by treatment with the appropriate acid as previously indicated, followed by concentration of the resulting solution, with the latter step being preferably conducted in vacuo and at room temperatures, i.e., at non-elevated temperatures.

As previously indicated, the compounds of the present invention are all readily converted to the useful 1,3-diacyloleandomycins of the prior art, such as 1,3-diacetyloleandomycin, by a simple one-step condensation reaction with the appropriate oleandrose compound. This is accomplished in a most convenient manner by simply treating the de-oleandrose diacyloleandomycin ester with either oleandrose or a suitable derivative thereof, e.g., one where there is an alkoxy or acyloxy group at the 1-position of the oleandrose molecule instead of hydroxy, until the desired condensation reaction takes place as hereinafter indicated. For instance, this particular reaction is preferably conducted by heating a substantially equimolar mixture of the two principal reactants together in a reaction-inert organic solvent in the presence of an acid catalyst at a temperature that is in the range of from about 60° C. up to about 120° C. for a period of from about one-half to about 16 hours. A slight excess of ring-compound reagent may be used (for example, up to about 10%), but larger excesses are to be avoided as this leads to a reduced yield of desired product due to separation difficulties which normally ensue. Reaction-inert organic solvents for use in this connection include halogenated hydrocarbon solvents such as methylene chloride, chloroform, ethylene dichloride, trichlorethylene s-tetrachlorethane, and the like, as well as nitroalkanes like nitromethane, nitroethane, 2-nitropropane, etc., in addition to lower alkyl nitriles such as actonitrile, propiononitrile, and the like, as well as N,N-di(lower alkyl) derivatives of lower alkane hydrocarbon carboxamides such as N,N-dimethylformaminde, N,N-diethylformamide, N,N,-di(n-propyl) formamide, N,N-dimethylacetamide, N,N-diethylacetamide, N,N-dimethylpropionamide, and so on. Usually, the amount of acid catalyst employed in order to effect said condensation is such that it is at least one equivalent in moles with respect to the deoleandrose oleandomycin key intermediate since the latter type compound always contains one basic dimethylamino group. Inasmuch as a slight excess of one equivalent of acid is ordinarily required for optimum results, it is usually more convenient in practice to just first convert the deoleandrose diacyloleandomycin intermediate to one of its crystalline acid addition salts, such as the hydrochloride or methanesulfonate, and then to use the latter material as such for all subsequent condensation work with the aforesaid oleandrose-type reagent. Preferred acid catalysts for use in this connection include both mineral and organic acids, such as hydrochloric acid, sulfuric acid, phosphoric acid, methanesulfonic acid and benzenesulfonic acid, etc.

Recovery of the desired 1,3-diacyloleandomycin ester products of this reaction from the foregoing reaction mixtures is then effected by simply allowing said products to be isolated in the form of their salts via concentration of said reaction mixtures while under reduced pressure. In most cases, this simply involves complete evaporation of the solvent until dryness is attained in order to afford a solid residual material. This residual material can then be purified by such conventional means as trituration with an organic solvent such as diethyl ether or ethyl acetate to remove excess reagent, and further purified by means of column chromatography, if necessary, or partitioning between water and chloroform, whereby the product is ultimately recovered from the chloloform layer as an amorphous free base.

Needless to say, the valuable key intermediate compounds of this invention can also be reacted with other reagents that will condense with free hydroxy group present in the de-oleandrose 1,3-diacyloleandomycin molecule to afford novel macrolide antibiotic products which also possess biological activity. These products include the so-called "mixed esters" such as 2-mono-propionyl-1,3-diacetyloleandomycin, as well as other oleandomycin-types wherein the oleandrose moiety of the molecule has been replaced by a new ring-system or side chain.

This invention is further illustrated by the following examples, which are not to be construed in any way as imposing any limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A solution consisting of 814 g. (1.0 mole) of triacetyloleandomycin and 192 g. (2.0 moles) of methanesulfonic acid dissolved in 3 liters of ethyl acetate was heated under reflux for one hour while being stirred mechanically. The crystalline slurry thus obtained was allowed to stand at ambient temperatures for one-half hour and then cooled in an ice-bath to room temperature (20–25° C.). The crystals so formed were then collected in two large coarse sintered-glass funnels, and the wet cakes were subsequently washed with one liter of ethyl acetate and a little diethyl ether. Upon air-drying of the residual product, there was obtained a 491 g. (60%) yield of de-oleandrose 1,3-diacetyloleandomycin methanesulfonylhydrin methanesulfonate, $[\alpha]_D^{25}$ −38° (nitromethane).

*Example II*

A stirred suspension of 410 g. (0.5 mole) of de-oleandrose 1,3-diacetyloleandomycin methanesulfonylhydrin methanesulfonate (prepared as described in Example I) in two liters of isopropanol was treated with 500 ml. of 2.0 N sodium hydroxide, which was added in a dropwise manner from a separatory funnel. The resulting aqueous alcholic solution (at pH 11.4) was stirred for 45–60 minutes and then diluted with 1.5 liters of water, followed by extraction with chloroform (two 2-liter portions). The combined chloroform layers were then washed twice with one-half their volume of water and subsequently dried over anhydrous sodium sulfate. After removal of the drying agent by means of filtration and concentration of the resulting chloroform solution in vacuo to a total volume of one liter, there was obtained a residual concentrate which on trituration with an equal volume of n-heptane (added with stirring) afforded the formation of a crystalline precipitate therefrom. The crystals thus obtained were recovered by means of filtration, washed with n-heptane and air-dried to constant weight. In this manner, there was obtained a 251 g. yield of product which when combined with an additional 59.5 g. of material recovered from the mother liquor (via concentration to a thick crystalline slurry) and subsequently washed, afforded a total yield of 311 g. (99%) of de-oleandrose 1,3-diacetyloleandomycin $[\alpha]_D^{23}$ +3° (nitromethane).

*Example III*

The procedure described in the preceding two examples is again repeated, only employing this time as starting material in place of triacetyloleandomycin (and on the same molar basis, of course) any of the other triacyl oleandomycin esters first reported by the present inventor in U.S. Patent No. 3,022,219. In each and every case, the corresponding de-oleandrose diacyloleandomycin ester is the product which is obtained. These products are:

De-oleandrose 1,3-dipropionyloleandomycin
De-oleandrose 1,3-dibutyryloleandomycin
De-oleandrose 1,3-divaleryloleandomycin
De-oleandrose 1,3-dicaproyloleandomycin

Example IV

A solution consisting of 251 g. (0.40 mole) of crystalline de-oleandrose 1,3-diacetyloleandomycin in one liter of chloroform was cooled by immersion in a cold-water bath, while 38.4 g. (0.40 mole) of methanesulfonic acid in one liter of ethyl acetate was added rapidly thereto with the aid of stirring, followed by the addition of one liter of ethyl acetate. Crystallization soon occurred after completion of this step, while stirring of the entire reaction mixture continued to be maintained. The crystals were then collected by means of filtration and washed thoroughly with ethyl acetate and diethyl ether, followed by air-drying. In this manner, there was obtained a 269 g. (87%) yield of de-oleandrose 1,3-diacetyloleandomycin methanesulfonate.

Example V

The procedure described in Example IV is repeated employing in place of the de-oleandrose 1,3-diacetyloleandomycin base as starting material for this reaction any one of the other previously reported products in Example III. In each and every case, the corresponding de-oleandrose 1,3-diacyloleandomycin methanesulfonate salt is the product which is obtained when the same molar proportions and reaction conditions as described in the preceding example are used here.

In like manner, the use of ethanesulfonic acid, propanesulfonic acid, n-butanesulfonic acid, benzenesulfonic acid, p-toluenesulfonic acid, α-naphthalenesulfonic acid and β-naphthalenesulfonic acid in place of the methanesulfonic acid used above (or as in Example IV) on the same molar basis, of course, affords the corresponding sulfonic acid addition salts of the appropriate de-oleandrose 1,3-diacyloleandomycin base in each and every case.

Example VI

The hydrochloride salt of de-oleandrose 1,3-diacetyloleandomycin is prepared by dissolving the base compound at room temperature (25° C.) in an ethyl acetate solution containing an equivalent amount in moles of hydrochloric acid, and then evaporating or concentrating under reduced pressure, if necessary, the resulting organic solution to either dryness or to incipient crystallization, as the case may be, while still maintaining the temperature of the system within this neighborhood. Further purification of the hydrochloride salt can then be carried out, if so desired, by employing the same method indicated by the present inventor for the corresponding oleandomycin salt in Antibiotics Annual 1957–1958, p. 478. This paper also provides a general method of preparation for all these type salts.

In like manner, other acid addition salts of this compound as well as of the products reported in Example III are also prepared by merely employing hydrobromic acid, phosphoric acid, sulfuric acid, oxalic acid, dichloracetic acid, maleic acid, tartaric acid, salicylic acid, phthalic acid and citric acid in place of hydrochloric acid in accordance with this very same procedure. In each and every case, the corresponding de-oleandrose 1,3-diacyloleandomycin acid addition salt is the product which is obtained.

Example VII

A solution consisting of 5 g. of de-oleandrose 1,3-diacetyloleandomycin methanesulfonate and 4 g. of L-oleandrose dissolved in 100 ml. of nitromethane (previously dried over anhydrous magnesium sulfate) containing an additional 60 mg. of methanesulfonic acid was refluxed under a nitrogen atmosphere for 18 hours. Upon completion of this step, the solvent was removed in vacuo and the residual material was dissolved in chloroform, which solution was then extracted with four one-half volumes of water. The retained organic layer was then dried over anhydrous sodium sulfate, filtered and the filtrate subsequently concentrated under reduced pressure. The resulting concentrate was then chromatographed on a column of alumina (120 g. in chloroform), employing chloroform as an eluting solvent. Evaporation of appropriate fractions then gave concentrates containing 1,3-diacetyloleandomycin (first reported in U.S. Patent No. 3,022,219) as demonstrated by paper chromatographic techniques described by T. M. Lees, et al. in the Journal of Chromatography, vol. 5, pp. 126–130 (1961).

Example VIII

The procedure described in Example VII is repeated employing in place of the L-oleandrose component, as reagent, 3 g. of 1-O-methyl-L-oleandrose instead. Again, as in Example VII, 1,3-diacetyloleandomycin is the desired product which is obtained in the concentrates.

Example IX

The procedure described in Example VII is followed except that the other products first reported in Example III are individually employed here as starting materials instead of de-oleandrose 1,3-diacetyloleandomycin (on the same molar basis, of course). In each and every case, the corresponding 1,3-diacyloleandomycin compound is the product which is obtained. These products are:

1,3-dipropionyloleandomycin
1,3-dibutyryloleandomycin
1,3-divaleryloleandomycin
1,3-dicaproyloleandomycin

What is claimed is:

1. A compound selected from the group consisting of a 1,3-diacyloleandomycin wherein the oleandrose moiety has been replaced by a hydroxyl group, said compound having the formula

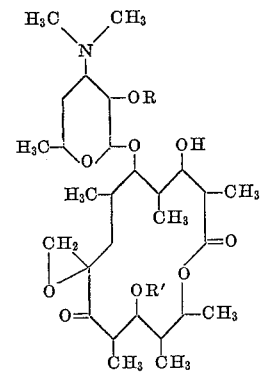

wherein each of R and R' is an unsubstituted alkanoyl group having from two to six carbon atoms; and the mineral and organic acid addition salts thereof.

2. The compound of claim 1 wherein each of R and R' is acetyl.

3. The compound of claim 1 wherein each of R and R' is propionyl.

4. The compound of claim 1 wherein each of R and R' is butyryl.

5. The compound of claim 1 wherein each of R and R' is valeryl.

6. The compound of claim 1 wherein each of R and R' is caproyl.

7. A process for preparing a de-oleandrose hydroxy 1,3-diacyloleandomycin ester wherein the acyl moiety is an unsubstituted alkanoyl group having from two to six carbon atoms, which comprises contacting the corresponding 1,2,3-triacyloleandomycin ester with at least a dimolar amount of a hydrocarbon sulfonic acid selected from the group consisting of lower alkane hydrocarbon sulfonic acids, benzenesulfonic acid, p-toluenesulfonic acid and the naphthalenesulfonic acids in a reaction-inert polar organic solvent at a temperature that is in the range of from about 20° C. up to about 100° C. for a period of about one-half to about five hours, filtering the resulting crystalline slurry of de-oleandrose hydroxy 1,3-diacyloleandomycin sulfonylhydrin sulfonate and dissolving the filter cake thus obtained in a lower alkanol, adjusting the pH of the latter solution to a pH that is at least about 8.0, and thereafter recovering the free de-oleandrose hydroxy 1,3-diacyloleandomycin base therefrom.

8. A process as claimed in claim 7 wherein the 1,2,3-triacyloleandomycin ester starting material is 1,2,3-triacetyloleandomycin.

9. A process as claimed in claim 7 wherein the hydrocarbon sulfonic acid is methanesulfonic acid.

10. A process as claimed in claim 7 wherein the reaction-inert polar organic solvent is a lower alkyl ester of a lower alkane hydrocarbon carboxylic acid.

References Cited in the file of this patent

Els et al.: Jour. Amer. Chem. Soc., vol. 80 (July 20, 1958), pages 3777–3782.

Hochstein et al.: Jour. Amer. Chem. Soc., vol. 82 (June 20, 1960), pages 3225–3227.